US008010500B2

(12) United States Patent
Chun et al.

(10) Patent No.: US 8,010,500 B2
(45) Date of Patent: Aug. 30, 2011

(54) METHOD AND SYSTEM FOR CAPTURING IMAGE OF WEB SITE, MANAGING INFORMATION OF WEB SITE, AND PROVIDING IMAGE OF WEB SITE

(75) Inventors: Se-Jin Chun, Seoul (KR); Hee-Won Lee, Seoul (KR); Ji-Hun Yoon, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 368 days.

(21) Appl. No.: 11/817,157

(22) PCT Filed: Mar. 9, 2006

(86) PCT No.: PCT/KR2006/000828
§ 371 (c)(1),
(2), (4) Date: Aug. 27, 2007

(87) PCT Pub. No.: WO2006/096015
PCT Pub. Date: Sep. 14, 2006

(65) Prior Publication Data
US 2008/0168085 A1 Jul. 10, 2008

(30) Foreign Application Priority Data
Mar. 10, 2005 (KR) .................. 10-2005-0020262

(51) Int. Cl.
*G06F 17/30* (2006.01)
(52) U.S. Cl. ................. 707/667; 707/803; 707/E17.019
(58) Field of Classification Search .................. 707/102, 707/204, 667, 803, E17.019, 999.102
See application file for complete search history.

(56) References Cited

U.S. PATENT DOCUMENTS

| | | | |
|---|---|---|---|
| 6,211,871 B1 * | 4/2001 | Himmel et al. ............... | 715/744 |
| 6,269,370 B1 * | 7/2001 | Kirsch .................................. | 1/1 |
| 6,272,484 B1 * | 8/2001 | Martin et al. ..................... | 707/1 |
| 6,614,770 B1 * | 9/2003 | Kayama et al. ............... | 370/331 |
| 6,625,624 B1 * | 9/2003 | Chen et al. ..................... | 707/204 |
| 6,658,662 B1 * | 12/2003 | Nielsen ......................... | 725/109 |
| 6,845,475 B1 * | 1/2005 | He ................................. | 714/53 |
| 6,980,232 B2 * | 12/2005 | Suzuki ....................... | 348/207.1 |
| 7,027,652 B1 * | 4/2006 | I'Anson ....................... | 382/218 |

(Continued)

FOREIGN PATENT DOCUMENTS

JP 2002-132570 * 5/2002

(Continued)

OTHER PUBLICATIONS

Waybackmachine, Internet Archive, webpage dated Aug. 20, 2007.

*Primary Examiner* — Hung T Vy
*Assistant Examiner* — Phuong-Thao Cao
(74) *Attorney, Agent, or Firm* — H.C. Park & Associates, PLC

(57) ABSTRACT

A website image capturing method includes the steps of: receiving at least one network address from a predetermined website information management system; accessing a website corresponding to the received at least one network address and determining whether a predetermined webpage error occurs in the website; generating image information through a capturing operation with respect to the website, when the webpage error does not occur in the website; generating predetermined access result information in association with the generation of the image information; and transmitting the access result information to the website information management system.

17 Claims, 9 Drawing Sheets

U.S. PATENT DOCUMENTS

| | | | |
|---|---|---|---|
| 7,047,296 B1* | 5/2006 | Safstrom et al. | 709/224 |
| 7,100,123 B1* | 8/2006 | Todd et al. | 715/862 |
| 7,576,752 B1* | 8/2009 | Benson et al. | 345/619 |
| 7,595,816 B1* | 9/2009 | Enright et al. | 348/150 |
| 7,685,273 B1* | 3/2010 | Anastas et al. | 709/224 |
| 2002/0032677 A1* | 3/2002 | Morgenthaler et al. | 707/3 |
| 2002/0083188 A1* | 6/2002 | Hericy et al. | 709/235 |
| 2002/0083202 A1* | 6/2002 | Nakamura | 709/246 |
| 2002/0112020 A1* | 8/2002 | Fisher | 709/215 |
| 2003/0064150 A1* | 4/2003 | Pitts | 427/130 |
| 2003/0076528 A1* | 4/2003 | Parry et al. | 358/1.15 |
| 2003/0101088 A1* | 5/2003 | Lohavichan | 705/10 |
| 2003/0187798 A1* | 10/2003 | McKinley et al. | 705/50 |
| 2004/0034647 A1* | 2/2004 | Paxton et al. | 707/102 |
| 2004/0123244 A1* | 6/2004 | Campbell et al. | 715/517 |
| 2004/0215483 A1* | 10/2004 | Fixman | 705/1 |
| 2005/0010639 A1* | 1/2005 | Long et al. | 709/204 |
| 2005/0066290 A1* | 3/2005 | Chebolu et al. | 715/808 |
| 2005/0108435 A1* | 5/2005 | Nowacki et al. | 709/246 |
| 2005/0120060 A1* | 6/2005 | Meng | 707/202 |
| 2005/0149880 A1* | 7/2005 | Postrel | 715/808 |
| 2005/0273368 A1* | 12/2005 | Hutten et al. | 705/4 |
| 2005/0286863 A1* | 12/2005 | Howarth | 386/52 |
| 2006/0069675 A1* | 3/2006 | Ogilvie | 707/3 |
| 2006/0161503 A1* | 7/2006 | Popescu et al. | 705/400 |
| 2006/0206460 A1* | 9/2006 | Gadkari | 707/3 |
| 2006/0265417 A1* | 11/2006 | Amato et al. | 707/102 |
| 2006/0294052 A1* | 12/2006 | Kulkami et al. | 707/1 |

FOREIGN PATENT DOCUMENTS

| | | |
|---|---|---|
| KR | 10-2000-0036647 | 7/2000 |
| KR | 10-2000-0063482 | 11/2000 |
| KR | 10-2001-0015981 | 3/2001 |

* cited by examiner

FIG. 4
< SECOND DB 350 >
| | | WEBSITE IDENTIFIER : NAVER | | | |
|---|---|---|---|---|---|
| IMAGE INFORMATION | | TIME INFORMATION (CAPTURED TIME) | NUMBER OF POP-UPS | NUMBER OF ERRORS | STATE |
| 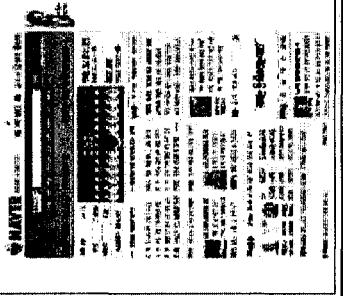 | | 2005-01-25 01:26:09 | 0 | 0 | OK |
| 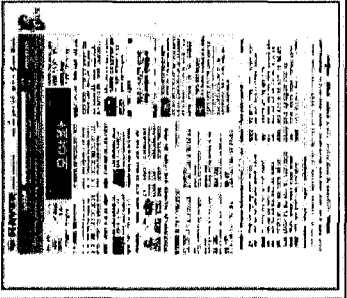 | | 2005-01-17 19:20:33 | 3 | 24 | FAIL |

METHOD AND SYSTEM FOR CAPTURING IMAGE OF WEB SITE, MANAGING INFORMATION OF WEB SITE, AND PROVIDING IMAGE OF WEB SITE

CROSS REFERENCE TO RELATED APPLICATIONS

This application is a U.S. National Phase Application of International Application PCT Application No. PCT/KR2006/000828 filed on Mar. 9, 2006, which claims the benefit of priority from Korean Patent Application No. 10-2005-0020262 filed on Mar. 10, 2005. The disclosures of International Application PCT Application No. PCT/KR2006/000828 and Korean Patent Application No. 10-2005-0020262 are incorporated herein by reference.

TECHNICAL FIELD

The present invention relates to a website image capturing method, a website information managing method and a website image providing method which can repeatedly capture at least one website, generate image information and provide a searcher with a history list about what contents a corresponding website are included at a predetermined previous point in time, by utilizing the image information, and a system of enabling the methods.

BACKGROUND ART

With developments in networks, a large number of people acquire information from the Internet. In this instance, information in the Internet is generally transmitted via a website which is displayed on a terminal screen.

As in offline information transmission media such as a newspaper and a television broadcast, even in the case of information transmission via a website, information may be displayed to a searcher to only certain extents. Also, all information may not be displayed in a single website. Although information that has been exposed in a website may be completely displayed in a single website, burdens on a system operating the website may be significantly increased. Also, a searcher who wants to search for previous information may suffer an inconvenience in such searching.

The Internet continuously updates past information so as to quickly disclose a large amount of current information. Accordingly, a searcher may desperately desire to know what kind of information had been displayed in a website. However, a service which can satisfy a searcher's such desire has not been developed.

A service which periodically visits a particular Uniform Resource Locator (URL) site and records hypertext markup language (HTML) associated with the URL site and thus, records a previous history about the particular URL site is being provided. However, in this case, as time passes, an original text file of the previous history record utilizing HTML may disappear. In this instance, since the previous history may not be properly embodied, the previous history may not have any value as information.

If a previous history record model of a website which can semi-permanently record information without regard to deletion or change of an original text file and accurately transmit the previous history of the website to a searcher utilizing the recorded information is provided, information may be stably recorded and maintained.

Accordingly, a new model of generating and searching website history information which can satisfy a searcher's search request about what kinds of content a website had embodied at a predetermined previous point in time, by continuously generating a small amount of image information via repeated capturing operations with respect to at least one website and maintaining the image information as a previous history of the website is needed.

DISCLOSURE OF INVENTION

Technical Goals

The present invention is conceived to solve the aforementioned problems in the conventional art and thus, the present invention provides a website image capturing method, a website information managing method and a website image providing method which can repeatedly capture at least one website at predetermined time intervals, generate image information and accurately record a content that was included in the at least one website at a predetermined point in time, and a system of enabling the methods.

The present invention also provides a website image capturing method, a website information managing method and a website image providing method which can generate website image information within maximum allowable limits, even when a webpage error occurs in a target website to be captured, and a system of enabling the methods.

The present invention also provides a website image capturing method, a website information managing method and a website image providing method which can capture a particular website periodically or according to an advertiser's decision and also can determine an occurrence of a webpage error or a severity level of the webpage error so as to generate only image information having some value as information, and a system of enabling the methods.

Technical Solutions

To achieve the above objectives of the present invention and solve the aforementioned problems in the conventional art, according to an aspect of the present invention, there is provided a website image capturing method including the steps of: receiving at least one network address from a predetermined website information management system; accessing a website corresponding to the received at least one network address and determining whether a predetermined webpage error occurs in the website; generating image information through a capturing operation with respect to the website, when the webpage error does not occur in the website; generating predetermined access result information in association with the generation of the image information; and transmitting the access result information to the website information management system.

According to another aspect of the present invention, there is provided a website information managing method including the steps of: maintaining a list of network addresses corresponding to a predetermined website; receiving access result information to a website associated with a network address included in the list, from a predetermined website image capturing system; determining whether the received access result information includes image information associated with a capturing operation with respect to the website; editing the image information, when the image information is included; and recording the edited image information in a predetermined database in association with a website identifier identifying the website.

According to still another aspect of the present invention, there is provided a website information providing method including the steps of: maintaining a database including captured image information from a predetermined website; receiving a search request associated with the website from a searcher; extracting at least one image information associated with the website from the database, in response to the received search request; arranging the extracted image information according to the time information and generating history information of the website; and providing the searcher with the generated history information, as a result for the search request.

BRIEF DESCRIPTION OF DRAWINGS

FIG. 4 is a diagram illustrating a configuration of a second database according to the present invention;

BEST MODE FOR CARRYING OUT THE INVENTION

Hereinafter, a website image capturing method, a website information managing method and a website image providing method and a system of enabling the methods according to the present invention will be described.

The term "site story" as used in the present specification may indicate any service which can record, as history data, what kind of information a particular website corresponding to a unique network address was included at a predetermined previous point in time and provide the history data to any searcher who wants to search for a previous record of the website at the previous point in time. In particular, in the present specification, the "site story" may provide history data of at least one website as image information by a predetermined capture unit visiting the at least one website at predetermined time intervals and capturing an image of information included in the website. Namely, according to the present invention, since information that was included in a website at a predetermined previous point in time may be recorded as image information, a disadvantage that information may be omitted in the conventional art of recording history data of a website utilizing HTML may be effectively overcome. Also, history data of the website may be maintained regardless of a deletion of a link file associated with particular HTML due to a passing of time.

Figure 1:
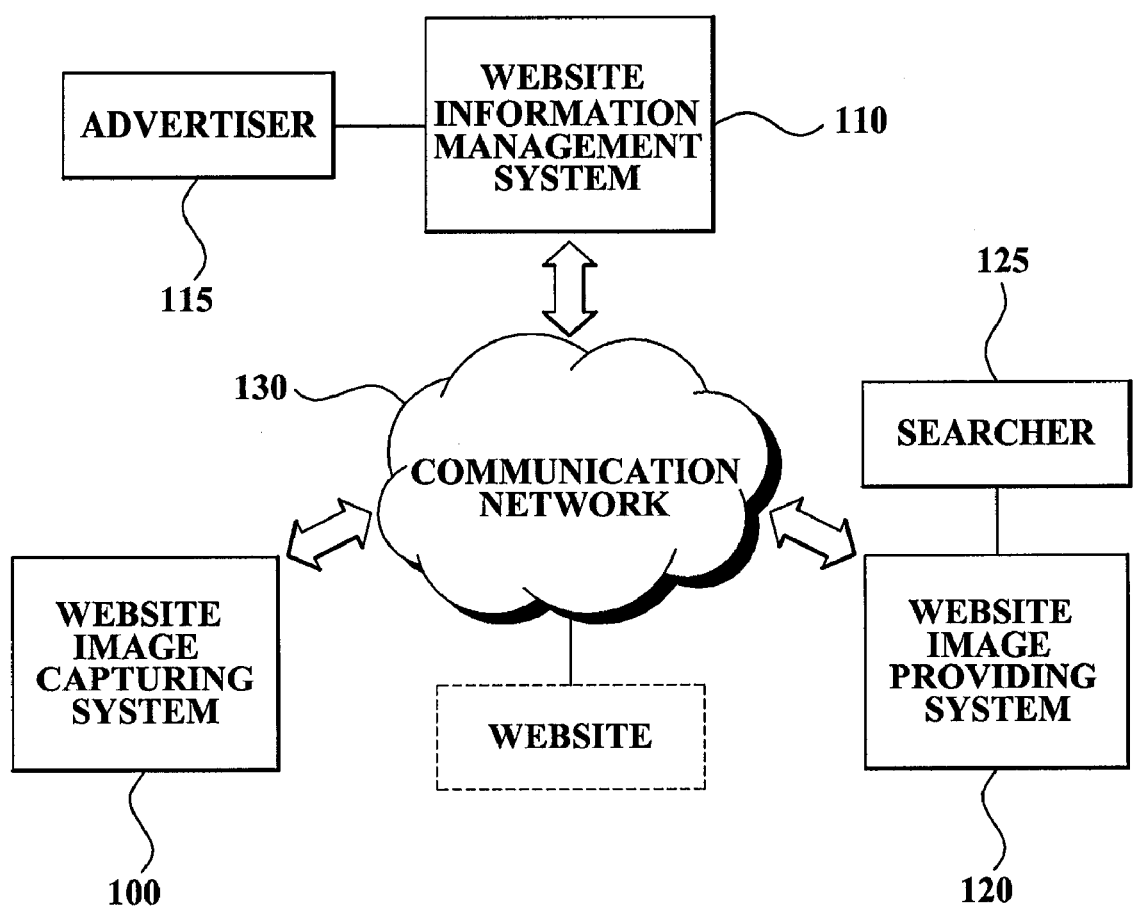
FIG. 1 is a diagram illustrating a network configuration with respect to a website image capturing system, a website information management system and a website image providing system according to the present invention.

FIG. 1 is a diagram illustrating a network configuration with respect to a website image capturing system, a website information managing system and a website image providing system according to the present invention.

A website image capturing system 100 functions to access a particular website utilizing a network address and capture a plurality of contents included in the website as one image. In this instance, the network address is transmitted from a website information management system 110. Capturing by the website image capturing system 100 is a process of scanning as one screen all contents that are embodied in an accessed website, converting the screen scanned data and generating image information. In this instance, a process of determining whether the contents may be captured according to an error analysis with respect to the website may be further included. After this, the website image capturing system 100 transmits generated image information and time information associated with the generation of the image information (image capturing) to the website information management system 110 as access result information.

The website information management system 110 functions to maintain a list of network addresses of target websites to be captured and transmit network addresses, which are called at predetermined time intervals, to the website image capturing system 100. Through this, image capturing with respect to a particular website may be performed. Also, the website information management system 110 maintains image information in a predetermined database in association with the website. In this instance, the image information is received from the website image capturing system 100 in response to a transmission of the network address. When the website information management system 110 stores image information, an environment may be provided in which content information included in a particular website may be provided as an image when a request for history information is received from a searcher 125.

A website image providing system 120 functions to generate a request signal for history information about a particular website, transmit the generated request signal to the website information management system 110 and receive image information which is retrieved by the website information management system 110, as a response to the request signal. Namely, the website image providing system 120 functions as a 'search engine server' which provides, as an image, information about what kinds of content a particular website had included at a predetermined previous point in time.

An advertiser 115 may be a website operator who maintains a terminal (not shown) for access to the website information management system 110, updates a network address about his/her related website to the website information management system 110, and thus records contents included in the website.

A searcher 125 may be an Internet user who, when the searcher 125 wants to know past information about a content that was included in a website at a previous point in time, inputs a predetermined website identifier in a searcher interface displayed on a terminal (not shown) and receives history information of a corresponding website as at least one image information.

Each of the website image capturing system 100, the website information management system 110 and the website image providing system 120 is connected to each other via a wired/wireless communication network 130 and enables various types of information/data to be transmitted/received. In particular, the website image capturing system 100 may access a website identified by a unique network address via the communication network 130. Also, the website image capturing system 100 may receive a captured image in the accessed website via the communication network 130.

Hereinafter, a configuration of the website image capturing system 100 according to the present invention will be described with reference to FIG. 2.

Figure 2:
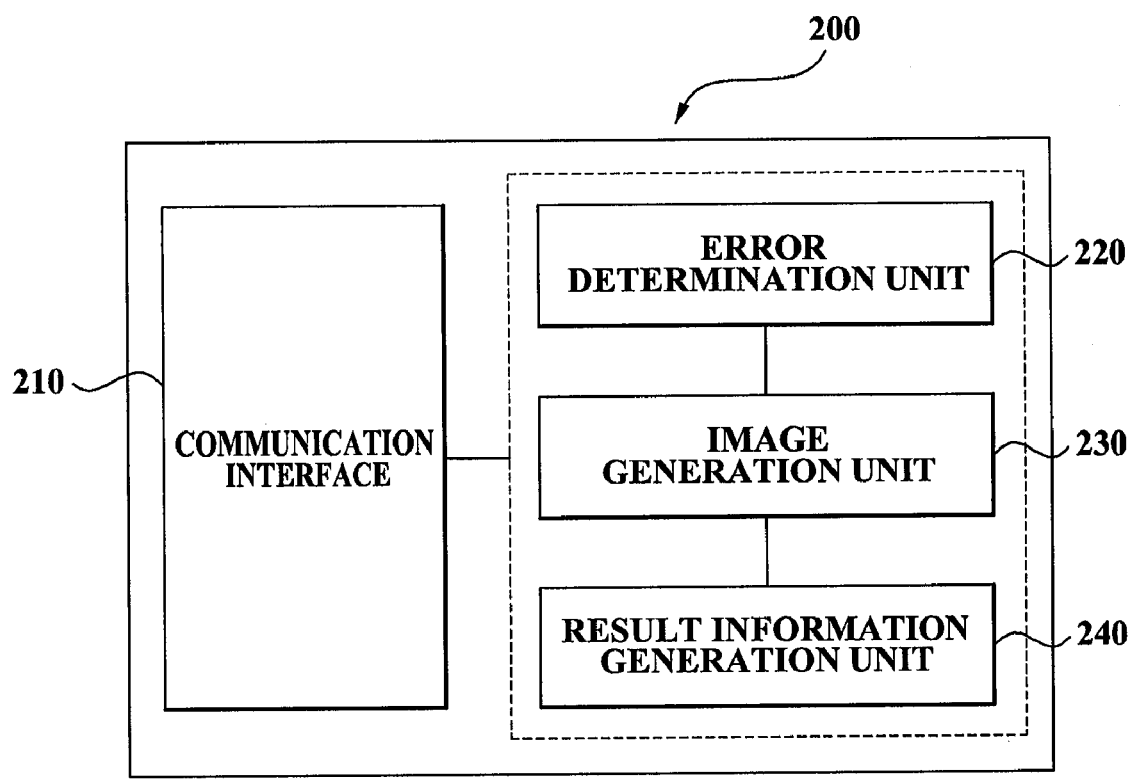
FIG. 2 is a block diagram illustrating an internal configuration of a website image capturing system according to an embodiment of the present invention.

FIG. 2 is a block diagram illustrating an internal configuration of a website image capturing system according to an embodiment of the present invention.

The website image capturing system 200 includes a communication interface 210, an error determination unit 220, an image generation unit 230 and a result information generation unit 240.

The communication interface 210 functions to receive at least one network address from the website information management system 110, and transmit access result information, which is generated in response to the received network address, to the website information management system 110. Namely, the communication interface 210 receives information of a target website to be captured. Also, the communication interface 210 transmits information about results of capturing with respect to the website, e.g. what kind of image information was generated and whether a webpage error occurs in the website, to the website information management system 110. When image information is generated by normally capturing the target website, the access result information may include image information in which a content displayed in the website is captured.

The error determination unit 220 functions to access a website corresponding to the received network address and determine whether a predetermined webpage error occurs in the website. In this instance, the webpage error indicates that display of the content included in the website is delayed or not possible since the content is not normally loaded. Such a webpage error prevents the image generation unit 230 from generating image information, which will be described later. Namely, the error determination unit 220 functions to determine whether a webpage error causing an obstacle in capturing an image occurs in a target website to be captured and also determine whether image information may be generated.

When the error determination unit 220 determines that a webpage error occurs in the target website, the capturing operation of the image generation unit 230 is omitted. Cause information about an inability to access the website or an inability to generate the image information is included in the access result information which is generated by a result information generation unit 240.

Also, when the error determination unit 220 determines that a webpage error occurs in the target website, the error determination unit 220 may control a predetermined parser to perform HTML parsing or tag analysis with respect to the website. Also, the error determination unit may generate analysis information about an occurrence of the webpage error or a severity level of the webpage error with respect to the website. In this instance, the analysis information includes detailed information about a webpage error which occurs in a corresponding website and information about a severity level of the webpage error. Namely, the error determination unit 220 performs phrase and tag analysis of a content with respect to a network address via the parser, and generates analysis information about a cause as to why an image may not be captured from the website. Also, the error determination unit 220 includes the analysis information in the access result information.

Also, although a webpage error occurs in a website, the error determination unit 220 does not omit all capturing operations. Namely, when a minor webpage error occurs, the error determination unit 220 still captures the website. In other words, the error determination unit 220 determines a severity of a webpage error by a unit of internal frames constituting the website. When a ratio of the internal frame to the size of the website (total number of internal frame) is within a set numerical value, the error determination unit 220 controls the image generation unit 230 to generate image information.

Also, the error determination unit 220 determines a deletion or a location change of the website through a predetermined validity check (URL validation) with respect to a received network address. Namely, the error determination unit 220 initially determines whether a target website set by the website information management system 110 is accessible. When the website is inaccessible since the website is missing or a network address of the website is changed, the error determination unit 220 includes related information in the access result information. In this instance, the access result information may include, for example, cause information (a network address error, a system error, etc.) about an inability to access the website and updating information of a changed network address of the website.

When the error determination unit 220 determines that a webpage error does not occur in a website, the image generation unit 230 functions to generate image information through a capturing operation with respect to the website. The image generation unit 230 captures and creates an image from a content which is displayed in the website. As an example, the image generation unit 230 may capture the entire image of an accessed website, analyze the captured image and compress the same and thereby generate image information. In this instance, an image captured by the image generation unit 230 may be generated as a plurality, such as a first image (thumbnail image) for providing as history information to the searcher 125 and a second image for providing the entire website according to the searcher's 125 selection on the history information. The first image is utilized when updating all images currently captured with respect to a particular website and providing the captured images to the searcher 125. The first image may be generated by partially capturing a main portion of the website and adjusting the captured portion by a tool by a predetermined ratio. The first image is included in a detailed information page which is supported in a site story service, and provides the searcher 125 with information about what types of content a particular website had displayed at a predetermined previous point in time. The second image is for providing one image as an entire image, according to the searcher's 125 selection on the first image included in the detailed information page. The second image is included in an expanded information page which may be supported in a site story service, and provides the searcher 125 with information about all contents that were displayed in the website at a point in time of the searcher's 125 selection.

In particular, the image generation unit 230 may analyze quality of a captured image and generate only image information in which the analyzed quality of the image satisfies a set minimum quality. For this, the image generation unit 230 may receive a standard for setting the minimum quality, e.g. from an operator of the present system, and when the captured image does not satisfy the set standard, delete a corresponding image information. The standard for determining the quality of an image may be variously determined by the operator of the present invention. As an example, the standard may include a number of colors of the captured image, the size of the image, the resolution, etc. Namely, the image generation unit 230 guarantees a certain level of quality of image information which is provided in the site story service.

Accordingly, satisfaction of the searcher 125 who utilizes the site story service may be optimally maintained.

Also, the image generation unit 230 enables a subsequent capturing operation after a predetermined time elapses, based on a point in time when a target website to be captured is initially accessed. After this, the image generation unit 230 waits for a loading of the website to be completed. This is because it will take a certain amount of time to load a content from a predetermined supply server and embody the loaded content from a website. Accordingly, a point in time when a capturing operation is performed by the image generation unit 230 (hereinafter, first point in time) must be later than a point in time when loading of a content is completed taking into consideration a system performance in loading the website (hereinafter, second point in time). When the first point in time precedes the second point in time due to a system error (e.g. when a capturing operation is performed in a state where loading of a website is not completed), the image generation unit 230 omits the capturing operation with respect to the website and includes the related information in the access result information. Namely, the image generation unit 230 performs a capturing operation only when loading of a website is completed, and does not perform a capturing operation while loading of the website is in progress. Accordingly, image information having some value as information may be generated.

In the present invention, image information having a value as history information of a site story service may indicate a content that is embodied in a website. In this instance, a pop-up which is utilized for event advertising may visually interfere with the content that has a value as substantial information. Accordingly, it is necessary to prevent activation of a pop-up. The image generation unit 230 controls a predetermined pop-up prevention unit to prevent a pop-up from being activated. In this instance, the pop-up is set in association with access to the website of the website image capturing system 200. To prevent activation of a pop-up by the pop-up prevention unit, a method of eliminating an event signal associated with activation of a pop-up is usually utilized. Also, a method of utilizing an external agent program may be considered. In this instance, a pop-up to be prevented may include a parasite browser, a message box, a moving picture player, a help window, etc., which is automatically activated when accessing the website. Also, the image generation unit 230 may calculate a number of pop-ups to be prevented by the pop-up prevention unit and include the related information in access result information.

As described above, according to the present invention, without a pop-up, i.e. without visual interference with respect to a content embodied in a website, image information may be generated. Accordingly, unnecessary information may not be included in the captured image information. Also, information desired to be recorded may not be concealed by a pop-up.

The result information generation unit 240 generates access result information in association with generation of image information. In this instance, the access result information may include information about an event occurring while accessing a website for capturing thereof, time information about a point in time when the website is captured, cause information about why image information is not generated, etc. Also, the result information generation unit 240 may include all necessary information in association with generation of image information. As an example, when a capturing operation is continued as is since the size of an internal frame including a webpage error is significantly smaller than the size of the entire website, the result information generation unit 240 may include related information (e.g. "internal frame error") in the access result information. Also, the result information generation unit 240 generates image information of a particular website, and when a quality of the generated image information is under a set standard, may delete the image information and include related information (e.g. "deterioration of image quality") in access result information.

Namely, according to the website image capturing system 200 of the present invention, since image information is generated by performing a capturing operation with respect to a particular website at predetermined time intervals, a content included in the website at a predetermined point in time may be accurately recorded. Also, according to the present invention, even when a webpage error occurs in a target website to be captured, image information of the website may be generated within the maximum allowable limits.

Hereinafter, a configuration of a website information management system 110 according to an embodiment the present invention will be described with reference to FIG. 3.

Figure 3:
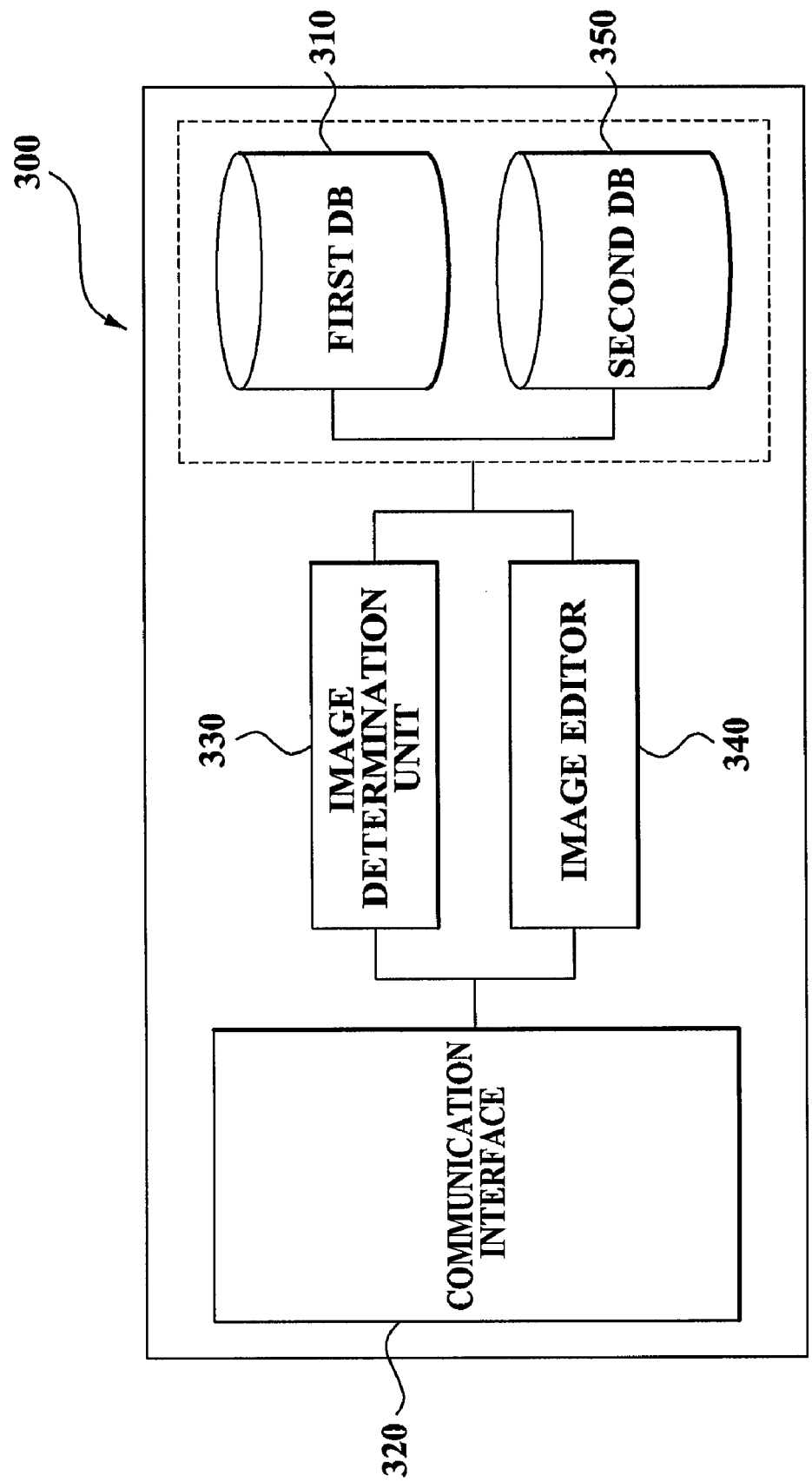
FIG. 3 is a block diagram illustrating an internal configuration of a website information management system according to an embodiment of the present invention.

FIG. 3 is a block diagram illustrating an internal configuration of a website information management system 300 according to an embodiment of the present invention.

The website information management system 300 includes a first database 310, a communication interface 320, an image determination unit 330, an image editor 340 and a second database 350.

The first database 310 maintains a list of network addresses corresponding to a predetermined website. In this instance, a network address to be included in the list may be received from, e.g. the advertiser 115 who operates the website. The first database 310 may store at least one network address corresponding to the website (or a website identifier identifying the website) of the advertiser 115. In this instance, a network address is location data for identifying a website in the communication network 130, such as a URL, a domain, an IP address, etc. Namely, under a predetermined contract, the first database 310 functions to maintain a network address received from the advertiser 115 who wants to generate history information of his/her website. Network addresses recorded in the first database 310 may be frequently updated according to arbitrary decisions of the advertiser 115.

The communication interface 320 receives access result information about a website associated with a network address included in the list, from the website image capturing system 200. As described above, the access result information indicates information associated with a capturing operation by the website image capturing system 200 which accessed a website corresponding to a particular network address. In particular, the access result information may include image information that is generated according to the capturing of a corresponding website. In the present specification, to give a different name from the communication interface 210 (first communication interface) which is included in the website image capturing system 200, the communication interface 320 included in the website information management system 300 is named as a second communication interface.

The image determination unit 330 determines whether the received access result information includes image information associated with the capturing of the website. Namely, the image determination unit 330 determines whether image information was generated by a normal capturing operation of the website image capturing system 200 with respect to a website or whether image information was not generated since a capturing operation was not possible due to a webpage error in a website.

When the image determination unit 330 determines that image information is not included in the access result information, the access result information including predetermined cause information may be included in the second database 350. As an example, when the website image capturing system 200 does not normally capture a website due to occurrence of a webpage error, etc., the image determination unit 330 controls only access result information, excluding image information, to be recorded in the second database 350 in association with a predetermined website identifier. As described above, the cause information is information about a cause as to why image information is not included in the access result information. Accordingly, the cause information may be information about an inability to access the website or an inability to generate the image information determined by the website image capturing system 200.

The image editor 340 edits image information, when the image information is included. Namely, the image editor 340 standardizes received image information and enables the image information to be optimally provided to the searcher 125 in a predetermined operation server which supports a site story service. The standardization may be a process of adjusting a captured image to be optimal in a system environment, such as resizing of image information, adjusting of a resolution, etc. The image editor 340 determines whether the image information may be standardized and edits only information which can be standardized. On the other hand, in the case of image information which cannot be standardized, the image editor 340 deletes the image information so that the same may not be recorded in the second database 350. Namely, considering a system environment supporting a site story service, the image editor 340 edits image information and deletes image information which cannot be edited. Through this, the image editor 340 functions to record and maintain history information of a website in an optimal state.

The second database 350 records edited image information in association with a website identifier identifying a website. Namely, the second database 350 functions to record a website identifier identifying a particular website and at least one image information as history information of the website. In particular, the second database 350 records time information corresponding to each image information. Through this, the second database 350 may provide the searcher 125, receiving a site story service, with information about when the image information was generated, received or recorded. In this instance, time information may be defined as any one of a generation point in time of the image information, a receiving point in time of the access result information, and a recording point in time in the second database 350.

Hereinafter, image information recorded in the second database 350 may be described in detail with reference to FIG. 4.

FIG. 4 is a diagram illustrating a configuration of a second database according to the present invention.

As shown in FIG. 4, image information is generated by the website image capturing system 200 and transmitted to the website information management system 300, and recorded in the second database 350 to correspond to each time information. Also, the website information management system 300 may analyze the access result information in association with the generation of the image information and record other information (related information when image information is generated) in the second database 350, as information to be provided to the searcher 125, along with the image information. As an example, in the second database 350 of FIG. 4, image information is recorded in correspondence to a website identifier 'naver'. Also, different image information (first image or second image) is recorded in association with time information which is associated with a point in time when a corresponding website was captured. Also, the second database 350 records image information and any other relevant information when generating the image information. Accordingly, a predetermined operator who operates the second database 350 may receive information that a number of pop-ups (a number of pop-up browsers in activation) is '0', a number of webpage errors is '0', and quality of image information is 'ok', etc., when capturing the website 'naver' on '2005-01-25'. Also, the operator may receive information that a plurality of webpage errors occurred and image information was not normally generated when capturing the website 'naver' on '2005-01-17'. In FIG. 4, a number of pop-ups, a number of occurred webpage errors, quality information of image information, etc. are recorded. Also, various types of information such as direct cause information about why image information was not generated or information about a severity level of the webpage error may be recorded. Also, in FIG. 4, as an example, a first image for embodiment in a detailed information page and a second image for embodiment in an expanded information page are recorded together in the second database 350, as image information. In addition, various methods of recording image information, such as a method of recording the entire website in one screen as image information, converting the image information of the entire screen in interoperation with providing of a site story service, may be utilized.

Figure 5:
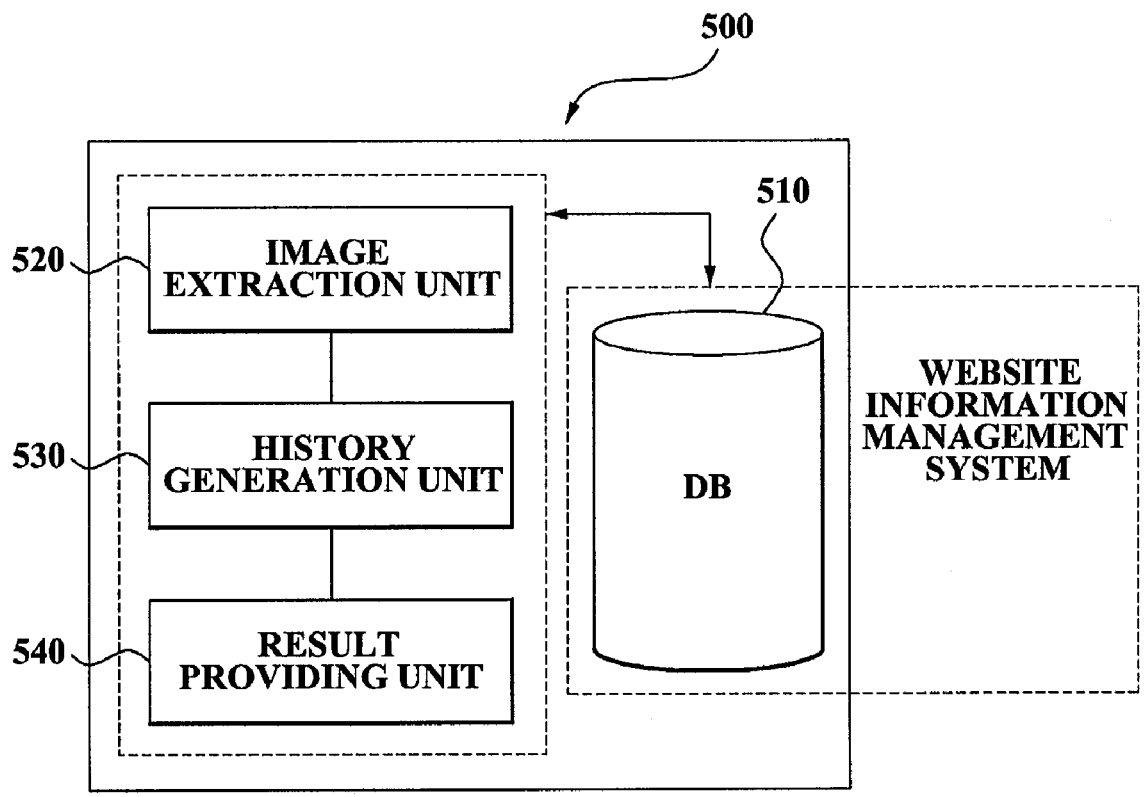
FIG. 5 is a block diagram illustrating an internal configuration of a website image providing system according to an embodiment of the present invention.

FIG. 5 is a block diagram illustrating an internal configuration of a website image providing system according to an embodiment of the present invention.

A website image providing system 500 according to the present embodiment includes a database 510, an image extraction unit 520, a history generation unit 530 and a result providing unit 540.

The database 510 stores captured image information from a predetermined website in association with time information according to a captured point in time of the image information or a recording point in time in the database 510. Namely, the database 510 records image information, which is generated by a capturing operation at a predetermined previous point in time, for each website, and enables each image information to be identified according to time information. Through this, information about a change of a content in a particular website over time may be provided to the searcher 125 who utilizes a site story service. The database 510 may be in a form of the second database 350 which is included in the website information management system 300 or in a form of a new database which is duplicated from the second database 350 and included in the website image providing system 500.

The image extraction unit 520 receives a search request associated with a website from the searcher 125, and in response to the received search request, extracting at least one image information associated with the website from the database 510. In this instance, the search request may be generated by inputting a website identifier in a terminal which activates a user interface associated with a site story service. Namely, the image extraction unit 520 functions to search the database 510 for image information corresponding to a website identifier inputted from the searcher 125.

The history generation unit 530 arranges extracted image information according to time information and generates history information of a website. Namely, the history generation unit 530 functions to generate history information to be provided to the searcher 125 in response to his/her search request. Also, the history generation unit 530 functions to re-arrange generated image information from a capturing operation with respect to a particular website, e.g. based on a generation point in time of the image information. Hereinafter, history information will be described in detail with reference to FIG. 6.

Figure 6:
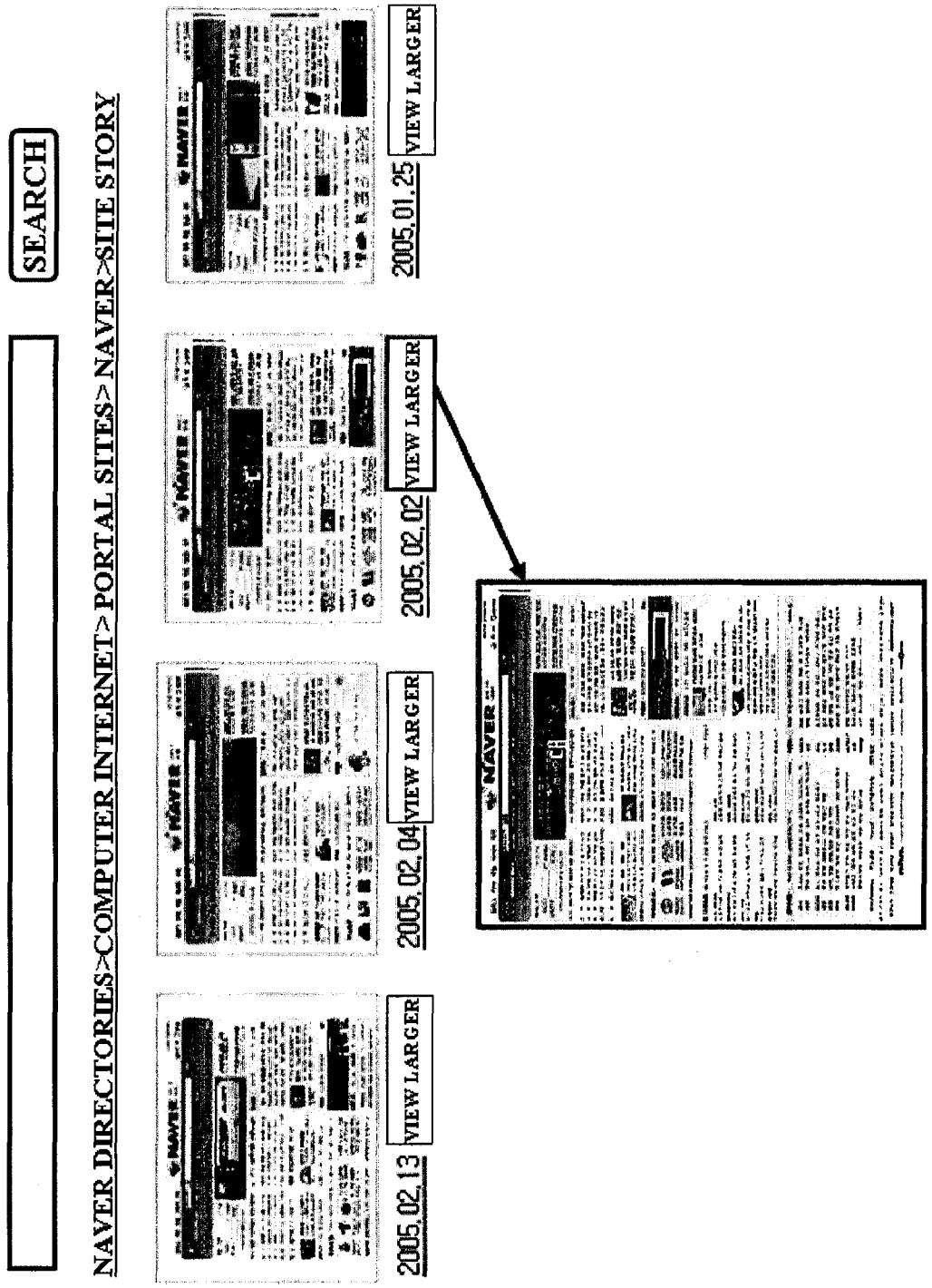
FIG. 6 is a diagram illustrating an example of history information according to an embodiment of the present invention.

FIG. 6 is a diagram illustrating an example of history information according to an embodiment of the present invention.

When the searcher 125 inputs a website identifier, the history generation unit 530 arranges image information, which is extracted from the database 510, into a predetermined form to be provided to the searcher 125, and generates history information. As an example, the history generation unit 530 extracts a first image (small image) for embodiment in a detailed information page, as image information to be extracted, and thus, enables a plurality of image information to be displayed on one screen. In FIG. 6, the history information includes five image information which are extracted according to inputting of website identifier 'naver', together with each corresponding time information. Namely, the history generation unit 530 chronologically arranges image information which was generated at a predetermined previous point in time with respect to the website 'naver', according to a captured time. Accordingly, it is possible to provide the searcher 125 with information about what kinds of content were included in the website 'naver' over time or what type of structure the contents were displayed. Also, history information is provided for the searcher 125 by the result providing unit 540. According to the searcher's 125 selection on particular image information included in the history information, the image extraction unit 520 may extract a second image from the database 510 and display the second image to the searcher 125 via another information window. Accordingly, the searcher 125 may check the previous state of the website on one screen. Also, the searcher 125 may receive information about what kinds of content were included in the website at a particular point of time, via an enlarged view.

The result providing unit 540 provides the searcher 125 with the generated history information, as a result for the search request. Namely, the result providing unit 540 functions to provide the searcher 125 who wants to receive a site story service associated with a particular website, with at least one image information which is arranged chronologically. In particular, the result providing unit 540 may provide the searcher 125 with image information including a higher resolution via another information window, according to the searcher's 125 selection on image information included in history information (click of an icon 'view larger' in FIG. 6) (see FIG. 6).

According to the present invention, history information about what kinds of content a particular website previously displayed may be provided as image information. Accordingly, related information may be recorded and maintained regardless of a deletion of an original text source.

Hereinafter, operation flow of the website image capturing system 200, the website information management system 300 and the website image providing system 500 constructed as above will be described in detail with respect to FIGS. 7 to 9.

Figure 7:
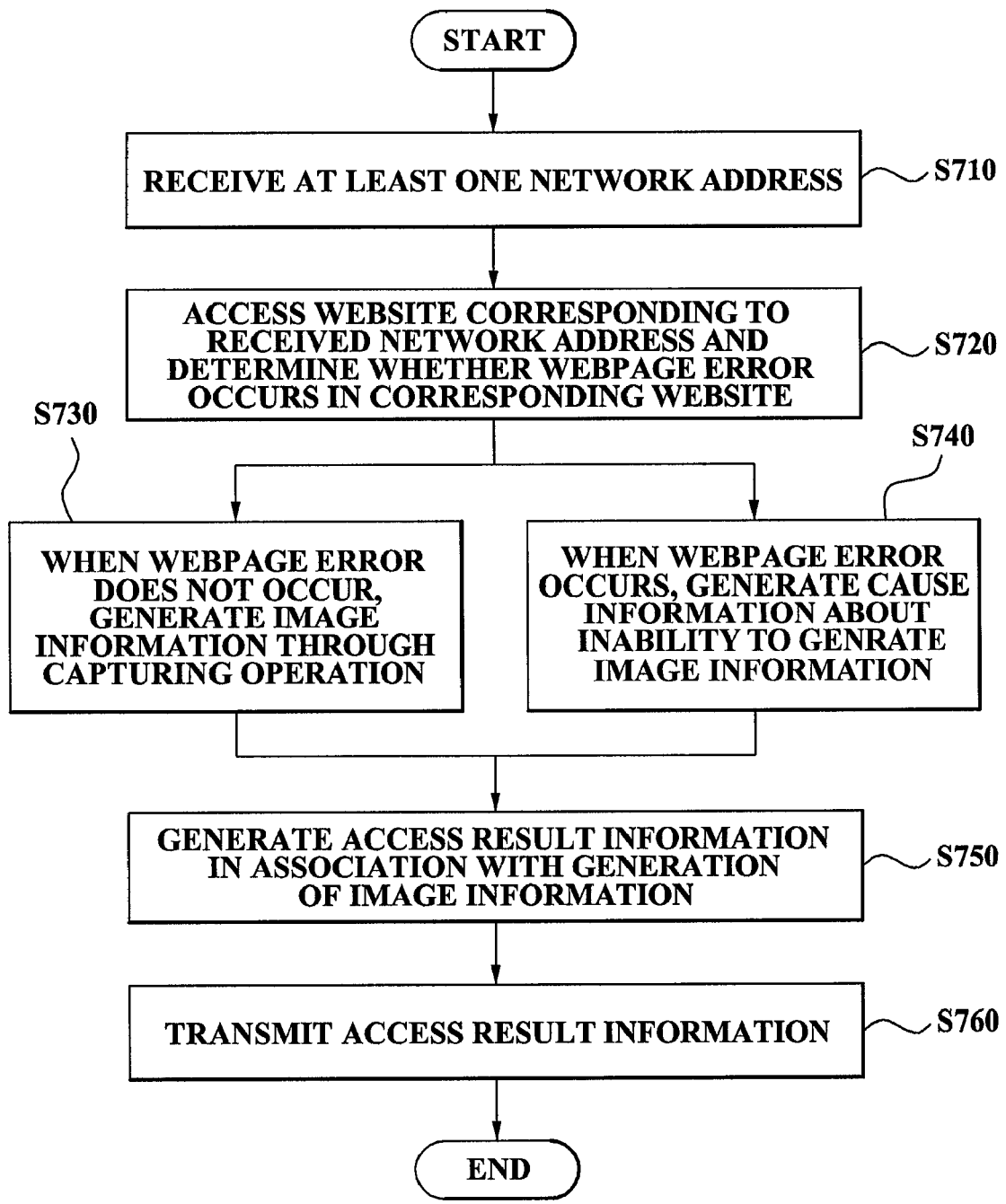
FIG. 7 is a flowchart illustrating a website image capturing method according to an embodiment of the present invention.

FIG. 7 is a flowchart illustrating a website image capturing method according to an embodiment of the present invention.

The website image capturing method according to the present embodiment is performed by the above-described website image capturing system 200.

In step S710, the website image capturing system 200 receives at least one network address from the website information management system 300. This step S710 is a process of receiving a network address of a target website to be captured. In this instance, the network address is received at time intervals set by a predetermined operator or at a point in time determined by the advertiser of the website. Prior to step S710, the website information management system 300 maintains a list of network addresses corresponding to the website associated with the advertiser 115, and selects a network address from the list according to a predetermined event signal associated with a capturing operation and transmits the selected network address to the website image capturing system 200.

In step S720, the website image capturing system 200 accesses a website corresponding to the received network address and determines whether a predetermined webpage error occurs in the website. This step S720 is a process before capturing the website. When capturing the website, it is determined whether a website image can be normally captured. Accordingly, it may be guaranteed that only image information having some value as information is generated. Namely, in step S720, the website image capturing system 200 checks whether a webpage error occurs in the website or a severity level of the webpage error and determines whether to proceed with the capturing.

Also, in step S720, the website image capturing system 200 determines an occurrence of a webpage error for each internal frame constituting the website. Also, the website image capturing system 200 calculates a ratio of the size of the internal frame where the webpage error occurred, with respect to the size of the website. In this instance, when the calculated ratio is within a set numerical value, the website image capturing system 200 continues a capturing operation. Also, the set numerical value may be set based on the operator's experiences. Accordingly, a numerical value may be selected so that an error is not most prominent since the size of an internal frame including a webpage error is significantly small.

In step S730, the website image capturing system 200 generates image information through a capturing operation with respect to the website, when a website error does not occur in the website. This step S730 is a process of imaging and recording a particular website through a capturing operation. When a webpage error does not occur in a target website to be targeted or a degree of a webpage error that occurs is insignificant, the website image capturing system 200 performs the capturing operation with respect to the website.

Also, in step S730, the website image capturing system 200 initially considers a point in time when loading of the website is completed, so as to perform the capturing operation. Accordingly, while loading of the website is in progress or when loading of the website is not completed, the website image capturing system 200 does not perform the capturing operation. However, in this case, the website image capturing system 200 determines a point of time for the capturing operation as when a predetermined time passes after the website was initially accessed, to not endlessly wait for loading of the website. Namely, the website image capturing system 200 may set a point of time when a capturing operation is performed, to a point of time when loading of the website is sufficiently completed, based on experience. When loading of the website is not completed when the capturing operation is to be performed, the website image capturing system 200 may determine an occurrence of an error caused by, e.g. a system error, and stop generating related image information.

Also, in step S730, the website image capturing system 200 evaluates the quality of the generated image information and when the quality does not satisfy the set standard, deletes the image information so as to not be recorded. Namely, the website image capturing system 200 records only image information which has some value as information and whose quality is more than a certain level, and does not record image information below the set standard. A standard for evaluating the quality of image information in step S730 may include a number of colors, a size and a resolution with respect to the image information. The website image capturing system 200 compares the number of colors, the size and the resolution of each generated image information with the set standard and determines the quality of corresponding image information.

Also, in step S730, the website image capturing system 200 may control a predetermined pop-up prevention unit to prevent activation of a pop-up. In this instance, the pop-up is set in association with access to the website. This is to prevent image information of the website from being generated in a state where a content having some value as information is concealed by a pop-up window for advertising. As described above, according to the present invention, since activation of a pop-up browser is prevented, a content of a website may not be concealed by a pop-up.

Also, in step S730, the website image capturing system 200 may perform a validity check with respect to the received network address, obtain information on a deletion or a location change of the website through the validity check, and re-transmit the obtained information to the website information management system 300 to correct and update the corresponding network address. Namely, when a target website to be captured is inaccessible or the network address of the website is changed, the website image capturing system 200 transmits the related information to the website information management system 300 so that a corresponding network address may be updated.

In operation S740, the website image capturing system 200 omits the capturing operation, and generates cause information about an inability to access the website or an inability to generate the image information in the access result information, when a webpage error occurs in the website. In this instance, the cause information may include analysis information on an occurrence of a webpage error or a severity level of the webpage error. Such analysis information may be generated through HTML parsing or tag analysis with respect to a corresponding website utilizing a parser.

In operation S750, the website image capturing system 200 generates predetermined access result information in association with generation of the image information. This step S750 is a process of generating all relevant information generated when generating image information, as access result information. In particular, when the generation of image information is not possible, the website image capturing system 200 includes related cause information in the access result information, so as to help analysis of the cause or a subsequent improvement process.

In operation S760, the website image capturing system 200 transmits the access result information to the website information management system 300.

As described above, according to the present invention, when a particular website is captured, an occurrence of a webpage error or a severity level of the webpage error is determined periodically or according to a decision of the advertiser 115. Accordingly, only image information that has some value as information may be generated.

Figure 8:
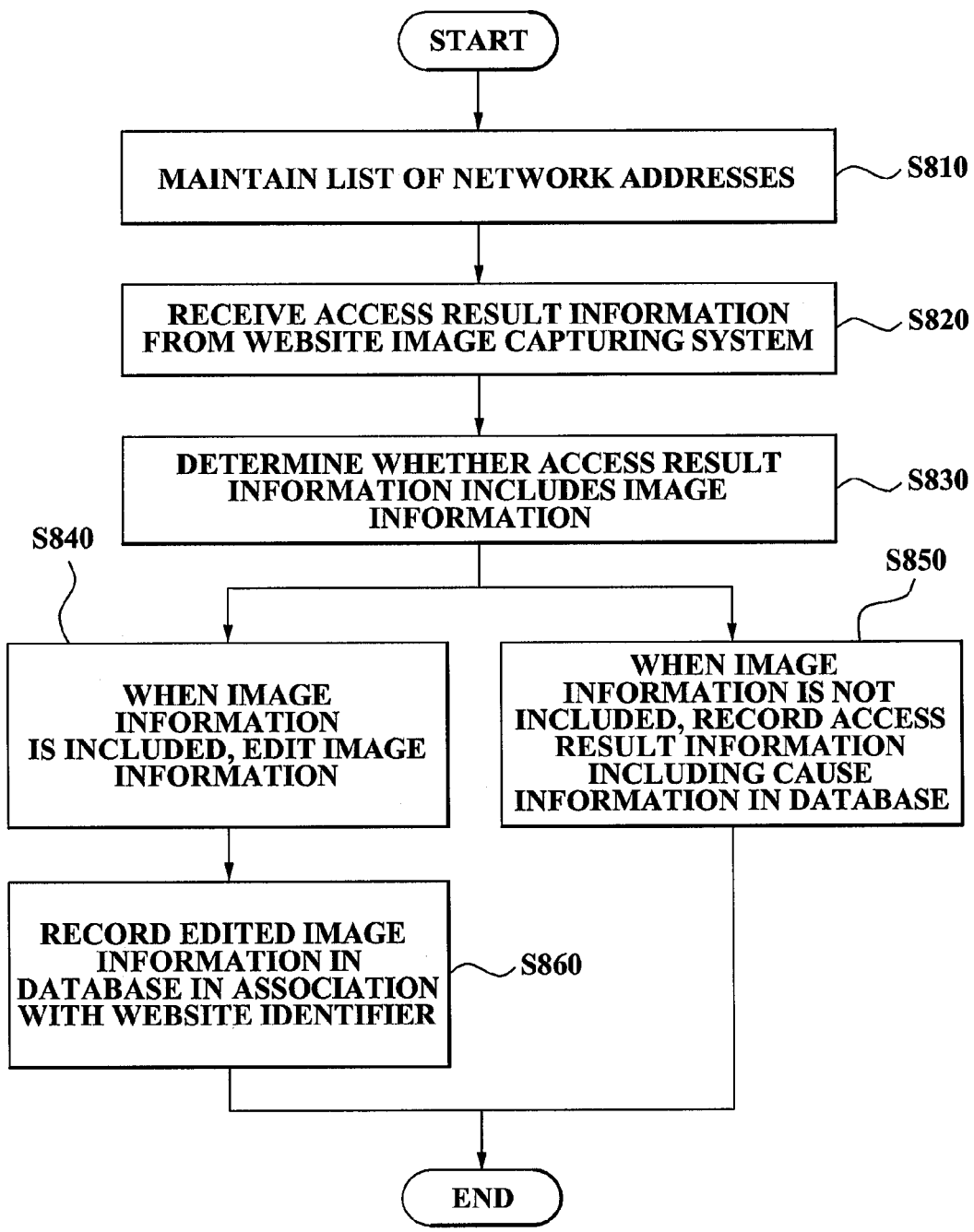
FIG. 8 is a flowchart illustrating a website information managing method according to an embodiment of the present invention.

FIG. 8 is a flowchart illustrating a website information managing method according to an embodiment of the present invention.

The website information managing method according to the present embodiment is performed by the website information management system 300.

In step S810, the website information management system 300 maintains a list of network addresses corresponding to a predetermined website. This step S810 is a process of collecting at least one network address which is received from the advertiser 115. The list includes a website identifier associated with the advertiser's 115 website and a network address specifying the website.

In step S820, the website information management system 300 receives access result information to a website associated with a network address included in the list, from the website image capturing system 200. This step S820 is a process of receiving the access result information as a result of a capturing operation with respect to a particular website.

In step S830, the website information management system 300 determines whether the received access result information includes image information associated with the capturing of the website. This step S830 is a process of checking whether the image information of a corresponding website is generated.

In step S840, the website information management system 300 edits the image information, when the image information is included. This step S840 is a process of standardizing the image information in association with recording the image information in the second database 350. As an example, the website information management system 300 standardizes the image information based on an image size, a resolution, etc., which are supported in, e.g. a site story service.

In operation S850, when the image information is not included in the access result information, the website information management system 300 records the access result information including predetermined cause information, in the second database 350 in association with the website identifier. This step S850 is not a process of recording the image information in the second database 350, but recording only access result information including information about an inability to access the website or inability to generate the image information in correspondence to a website identifier.

In operation S860, the website information management system 300 records the edited image information in the second database 350 in association with the website identifier identifying the website. This step S860 is a process of recording image information for providing a site story service with respect to a website. In step S860, image information is classified and recorded for each particular website (see FIG. 4). In this instance, the image information is recorded in the second database 350, corresponding to any one of a generation point in time of the image information, a receiving point in time of the access result information, and a recording point in time in the database 350.

As described above, according to the present invention, image information which was captured at a predetermined previous point in time is recorded in correspondence to each particular website. Accordingly, image information for a site story service may be systematically collected and recorded.

Figure 9:
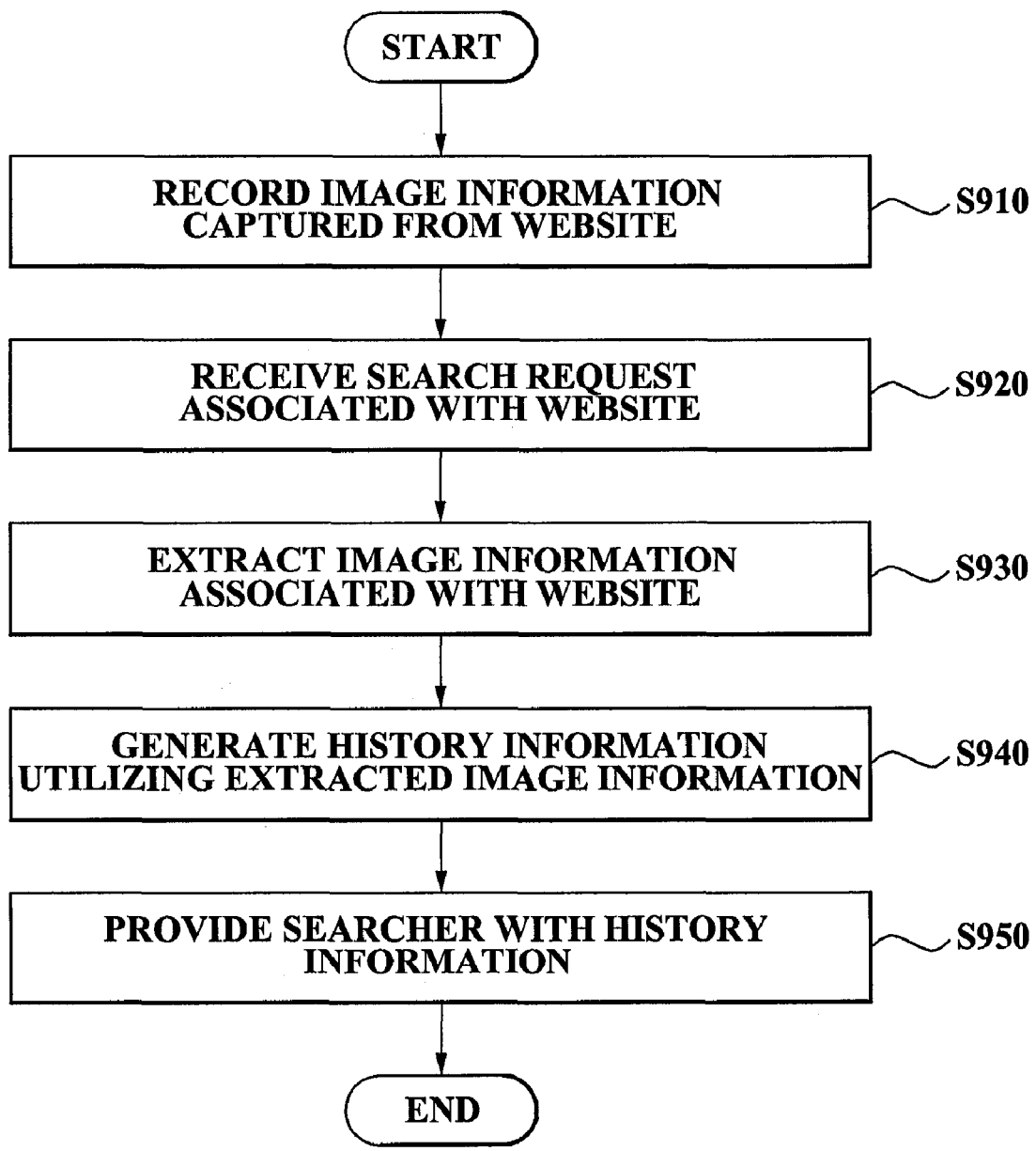
FIG. 9 is a flowchart illustrating a website information providing method according to an embodiment of the present invention.

FIG. 9 is a flowchart illustrating a website information providing method according to an embodiment of the present invention.

The website image providing method according to the present embodiment is performed by the website image providing system 500.

In step S910, the website image providing system 500 maintains the database 510 which maintains image information captured from a predetermined website. This step S910 is a process of recording at least one image information corresponding to a particular website. In this instance, the image information is associated with time information according to a capturing point in time of the image information or a recording point in time in the database 510.

In step S920, the website image providing system 500 receives a search request associated with the website from the searcher 125. In this step S920, the searcher 125 who wants to receive a site story service inputs a website identifier into a predetermined user interface, to generate the search request.

In step S930, in response to the received search request, the website image providing system 500 extracts at least one image information associated with the website from the database 510. This step S930 is a process of extracting the image information from the database 510. In this instance, the image information is recorded in the database 510 in correspondence to a website identifier inputted when the searcher 125 requests a search.

In step S940, the website image providing system 500 arranges the extracted image information chronologically according to the time information and generates history information of the website. This step S940 is a process of generating history information to be provided to the searcher 125 as a site story service. History information is generated by utilizing image information that is arranged chronologically with respect to one particular website (see FIG. 6).

In operation S950, the website image providing system 500 provides the searcher 125 with the generated history information, as a result for the search request. This step S950 is a process of providing the searcher 125 who wants to receive the site story service with history information. Previous record information of a particular website may be provided to the searcher 125 as one image information.

As described above, according to the present invention, a conventional website recording method utilizing HTML may be revised. Also, information about a content that was included in a website at a particular point in time may be more accurately obtained by utilizing image information of the website captured at a predetermined point in time.

The embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

As described above, according to the present invention, there are provided a website image capturing method, a website information managing method and a website image providing method which can repeatedly capture at least one website at predetermined time intervals, generate image information and accurately record a content that was included in the at least one website at a predetermined point in time, and a system of enabling the methods.

Also, according to the present invention, there are provided a website image capturing method, a website information managing method and a website image providing method which can generate website image information within maximum allowable limits, even when a webpage error occurs in a target website to be captured, and a system of enabling the methods.

Also, according to the present invention, there are provided a website image capturing method, a website information managing method and a website image providing method which can capture a particular website periodically or according to an advertiser's decision and also can determine an occurrence of a webpage error or a severity level of the webpage error so as to generate only image information having some value as information, and a system of enabling the methods.

The invention claimed is:

1. A method of archiving a website image, the method comprising the steps of:
    receiving at least one network address for archiving a website;
    accessing a website corresponding to the received network address repeatedly at time intervals;
    detecting an error in the accessed website in accordance with a predetermined rule;
    generating image information associated with the accessed website wherein the image information is generated based, at least in part upon a captured image of at least a portion of the accessed website if no error is detected according to the predetermined rule;
    generating access result information in association with the accessed website and the generated image information;
    generating a history list for each website accessed; and
    storing in the history list the generated access result information in a database for each repeat,
    wherein the step of detecting an error comprises the steps of:
        checking a size of the website and an internal frame, when a webpage error occurs in the internal frame constituting the website;
        calculating a ratio of the size of the internal frame to the size of the website, and when the calculated ratio is within a set numerical value, performing a capturing operation; and
        including information associated with the webpage error of the internal frame in the access result information.

2. The method of claim 1, wherein:
    an image of the accessed website is not captured and error information is generated, if an error is detected in accordance with the predetermined rule.

3. The method of claim 1, further comprising the steps of:
    parsing the accessed website;
    analyzing an error or a severity level of the webpage error with respect to the accessed website based, at least in part, upon the parsed information: and
    generating analysis information if an error is detected in accordance with the predetermined rule.

4. A method of archiving a web site image, the method comprising the steps of:
    receiving at least one network address for archiving a website;
    accessing a website corresponding to the received network address repeatedly at time intervals;

detecting an error in the accessed website in accordance with a predetermined rule;
generating image information associated with the accessed website wherein the image information is generated based, at least in part upon a captured image of at least a portion of the accessed website if no error is detected according to the predetermined rule;
generating access result information in association with the accessed website and the generated image information;
generating a history list for each website accessed; and
storing in the history list the generated access result information in a database for each repeat,
wherein the step of detecting an error comprises the steps of:
  checking a size of the website and an internal frame, when a webpage error occurs in the internal frame constituting the website;
  calculating a ratio of the size of the internal frame to the size of the website, and when the calculated ratio is within a set numerical value, performing a capturing operation;
  including information associated with the webpage error of the internal frame in the access result information;
  determining a location change of the website through a predetermined validity check with respect to the received network address; and
  generating website change information associated with the location change, when the website is changed, and including the website change information in the access result information, and the received network address is updated in a website information management system based on the website change information.

5. The method of claim 4, wherein the step of detecting an error further comprises the steps of:
  determining a deletion of the website through a predetermined validity check with respect to the received network address; and
  generating website change information associated with the deletion, when the website is deleted, and including the website change information in the access result information, and the received network address is updated in a website information management system based on the web site change information.

6. A method of archiving a website image, the method comprising the steps of:
  receiving at least one network address for archiving a website;
  accessing a website corresponding to the received network address repeatedly at time intervals;
  detecting an error in the accessed website in accordance with a predetermined rule;
  generating image information associated with the accessed website wherein the image information is generated based, at least in part upon a captured image of at least a portion of the accessed website if no error is detected according to the predetermined rule;
  generating access result information in association with the accessed website and the generated image information;
  generating a history list for each website accessed; and
  storing in the history list the generated access result information in a database for each repeat,
  wherein the step of generating the image information comprises the steps of:
    setting a first point in time when a capturing operation is performed, based on a point in time when the website is initially accessed; and
    determining whether the set first point in time is earlier than a second point in time when loading of the website is completed,
    wherein the capturing operation is not performed if the first point in time is earlier than the second point in time.

7. The method of claim 6,
wherein the step of generating the image information further comprises the steps of:
  setting a standard with respect to at least one of a number of colors, a size and a resolution with respect to the image information; and
  deleting the image information when at least one of the number of colors, the size, and the resolution with respect to the image information does not satisfy the set standard, and including information associated with the deleting of the image information in the result access information.

8. The method of claim 6,
wherein the step of generating the image information further comprises the step of blocking a pop-up window so as to prevent the pop-up window from being captured.

9. A computer readable storage medium comprising an executable program, which when executed performs the steps of:
  maintaining a list of network addresses;
  receiving access result information associated with a website associated with a network address included in the list, from a predetermined website image capturing system repeatedly at time intervals;
  detecting an error in the accessed website in accordance with a predetermined rule;
  generating image information associated with the accessed website wherein the image information is generated based, at least in part upon a captured image of at least a portion of the accessed website if no error is detected according to the predetermined rule;
  editing the image information if the image information is included;
  generating a history list for each website accessed; and
  storing in the history list the edited image information and one or more website identifier for each repeat,
  wherein the step of detecting an error comprises the steps of:
    checking a size of the website and an internal frame, when a webpage error occurs in the internal frame constituting the website;
    calculating a ratio of the size of the internal frame to the size of the website, and when the calculated ratio is within a set numerical value, performing a capturing operation; and
    including information associated with the webpage error of the internal frame in the access result information.

10. The computer readable storage medium of claim 9, wherein the access result information includes cause information of why the image information is not included therein and information about inaccessible website or inability to capture the image, if the image information is not included in the access result information.

11. The computer readable storage medium of claim 9, wherein the step of editing the image information determines whether a predetermined standardization about the image information is possible in association with recording in a database, and when the standardization is possible, edits the captured image.

12. The computer readable storage medium of claim 9, wherein the step of storing the edited image information stores the edited image information in a database, in association with at least one of a generation point in time of the image information, a receiving point in time of the access result information, and a recording point in time in the database.

13. The computer readable storage medium of claim 9, wherein the executable program, when executed, further performs the steps of:
   receiving a search request associated with a website from a searcher;
   extracting at least one image information associated with the website from a database, in response to the received search request;
   arranging the extracted image information according to the time information and generating history information of the website; and
   providing the searcher with the generated history information, as a result for the search request.

14. A computer readable storage medium comprising an executable program, which when executed performs the steps of:
   receiving at least one network address for archiving a website;
   accessing a website corresponding to the received network address repeatedly at time intervals;
   detecting an error in the accessed website in accordance with a predetermined rule;
   generating image information associated with the accessed website wherein the image information is generated based, at least in part upon a captured image of at least a portion of the accessed website if no error is detected according to the predetermined rule;
   generating access result information in association with the accessed website and the generated image information; and
   storing in a history list the generated access result information in a database for each repeat,
   wherein the step of detecting an error comprises the steps of:
      checking a size of the website and an internal frame, when a webpage error occurs in the internal frame constituting the website;
      calculating a ratio of the size of the internal frame to the size of the website, and when the calculated ratio is within a set numerical value, performing a capturing operation; and
      including information associated with the webpage error of the internal frame in the access result information.

15. A system comprising a computer programmed to capture a website image, the computer comprising:
   a communication interface configured to receive at least one network address from a predetermined website information management system, and configured to transmit access result information, which is generated in response to the received network address, to a separate history list in the website information management system repeatedly at time intervals for each network address;
   an error determination unit configured to access at each time interval a website corresponding to the received network address and configured to detect an error in the accessed website in accordance with a predetermined rule;
   an image generation unit configured to generate at each time interval image information associated with the accessed website wherein the image information is generated based, at least in part, upon a captured image of at least a portion of the accessed website if no error is detected according to the predetermined rule; and
   an information generation unit configured to generate at each time interval the access result information in association with the accessed website and the generated image information,
   wherein the error determination unit is configured to check a size of the website and an internal frame, when a webpage error occurs in the internal frame constituting the website; to calculate a ratio of the size of the internal frame to the size of the website, and when the calculated ratio is within a set numerical value, perform a capturing operation; and to include information associated with the webpage error of the internal frame in the access result information.

16. A system of managing website information, the system comprising:
   a computer-readable storage medium to store data;
   a first database to maintain a list of network addresses on the computer-readable storage medium, the list corresponding to a predetermined website;
   a communication interface configured to receive repeatedly at time intervals access result information of a website associated with a network address included in the list, from a predetermined website image capturing system;
   an image determination unit configured to determine at each time interval whether the received access result information includes image information associated with a capturing operation with respect to the website, wherein the image information is generated based, at least in part, upon a captured image of at least a portion of the website, if no error is detected according to the predetermined rule;
   an image editor configured to edit the image information if the image information is included; and
   a second database to record in a history list for each website the edited image information in association with a website identifier identifying the website for each repeat,
   wherein the image determination unit is configured to check a size of the website and an internal frame, when a webpage error occurs in the internal frame constituting the website; to calculate a ratio of the size of the internal frame to the size of the website, and when the calculated ratio is within a set numerical value, perform a capturing operation; and to include information associated with the webpage error of the internal frame in the access result information.

17. The system of claim 16, further comprising:
   an image extraction unit configured to receive a search request associated with the website from a searcher, and in response to the received search request, to extract at least one of the captured image information associated with the website from the second database; and
   a history generation unit configured to arrange the extracted image information according to the time information and to generate history information about the website; and a result providing unit configured to provide the searcher with the generated history information, as a result of the search request.

* * * * *